Patented May 1, 1923.

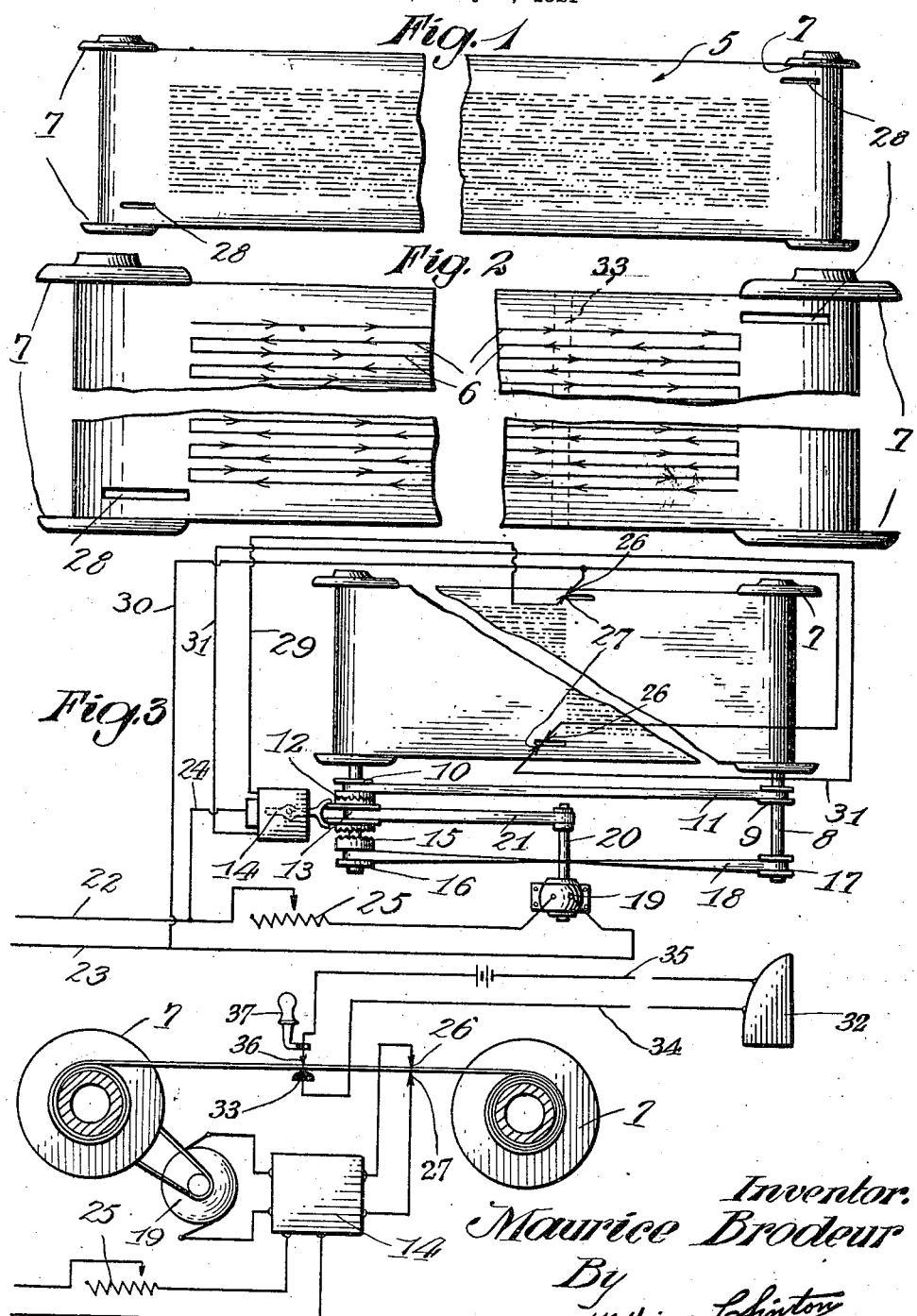

1,453,741

UNITED STATES PATENT OFFICE.

MAURICE BRODEUR, OF MONTREAL, QUEBEC, CANADA.

APPARATUS FOR TRANSMITTING WORDS.

Application filed May 7, 1921. Serial No. 467,706.

*To all whom it may concern:*

Be it known that I, MAURICE BRODEUR, a subject of the King of Great Britain, residing at Montreal, Province of Quebec, Canada, have invented certain new and useful Improvements in Apparatus for Transmitting Words; and I do hereby declare that the following is a full, clear, and exact description of the invention, such as will enable others skilled in the art to which it appertains to make and use the same.

The present invention relates to improvements in an apparatus for transmitting words or the sounds indicative of words to a distant point, but is especially adapted for the use of the blind or persons with defective eyesight and unable to read.

The primary object of the invention and principally of the method is the provision of an alternatively or reciprocatively moving roll or strip of paper or other suitable material having formed therein perforations and dot and dash signals corresponding to the Morse alphabetic code or any other conventional code now in common use.

Another object of the invention is the provision of an apparatus such as above referred to for imparting literature such as found in ordinary books, newspaper articles, current events and so forth, through the instrumentality of a perforated roll, the said perforations being in dot and dash arrangement and in code form so as to give corresponding electric impulses similar to those from a telegraph sounder.

Still another object of the improved apparatus is the provision of means whereby blind people are permitted to read by sound and by means of a telegraphic code, the said apparatus employing any form of telegraph sounder or any special sound box and can be sensed either with the use of a telephone head receiver or otherwise, the said sensing depending not upon the sense of touch, as is common in preparing books and literature for blind persons, but upon the hearing which is usually quite sufficiently sensitive with the majority of blind people to facilitate their reading by use of the above apparatus which can be very easily used to advantage after a few lessons in teaching them the code.

Another object of the invention is the provision for use in connection with the apparatus of a relatively long roll of material which may be of any length and width and which may be wound upon spools so controlled that the material with the script will move in reverse directions cooperating with the sound producing apparatus for transmitting the sound to persons desiring to read the literature marked thereon by means of the dot and dash code, the said dots and dashes being preferably spaced from one another in the proper and desired manner, and the code lines being divided into two divisions arranged in lines and reading in opposite directions, said lines being parallel and alternative, the said roll moving from the front of the reading instrument to the back and from the back to the front alternately for every two lines to prevent the rewinding of the code roll while reading, thus making the reading continuous, and the said dot and dash perforations of each code line being made in a reverse direction to that of the motion of the roll, consequently making the said dot and dash perforations opposite for every two lines and said roll further, having two larger and longer slots or perforations, one at each end provided on the opposite sides of the roll, the inner end of each of said slots being in alignment with the end of the code lines for cooperation with the reading instrument in reversing the motion of the said roll automatically.

A still further object of the present invention is the provision of an apparatus such as above referred to, which will be comparatively simple and inexpensive in its use, reliable and efficient in its operation, and so simple that it can be readily employed by a person of ordinary intelligence.

With the above and other objects in view, the present invention resides in the novel features of construction, formations, combinations and arrangements of parts in perfecting an apparatus, reliable and efficient in use, and easy of operation.

In order to illustrate my improved apparatus, the accompanying drawings are to be taken into consideration, in which;

Figure 1 is a plan view of a roll constructed in accordance with the present invention having the literature arranged thereon in dots and dashes indicative of the words to be transmitted to the person listening to the machine;

Figure 2 is an enlarged view thereof, partly broken away;

Figure 3 is a diagrammatic view of the mechanism for actuating the rolls in opposite directions; and, Figure 4 is a similar view of one form of the reversing mechanism which may be used.

Referring now to the accompanying drawings by corresponding characters of reference throughout the several views, the numeral 5 designates generally a roll of suitable material on which the literature to be transmitted is arranged in dots and dashes forming a code message, which are arranged in parallel lines 6. The ends of the roll 5 are wound upon suitable rollers or spools 7 carried by shafts 8 which have the pulleys 9 and 10 secured thereto over which a belt 11 passes for the purpose of driving both of the rollers simultaneously.

The pulley 10 is provided with a clutch face 12 which engages a shifting piece 13 actuated by a magnetic mechanism 14 which throws the shifting piece 13 into engagement with the clutch face 12 of the pulley 10 or the clutch face 15 of the pulley 16 which is connected to a pulley 17, keyed to the shaft 8, by means of a cross belt 18 for reversing the motion of the roll.

A motor 19 is mounted adjacent the machine and includes a drive shaft 20 which is connected to the rotatable clutch 13 by means of a belt 21.

Power may be transmitted to the motor 19 through the main conductors 22 and 23. A conductor 24 leads from the conductor 22 to the magnetic mechanism 14, while the said conductor 22 has a resistance 25 interposed between its connection with the conductor 24 and the said motor 19, for regulating the speed of the motor.

Pairs of spring pressed contact members 26 and 27 are arranged on opposite sides of the roll 5 and the members 26, 27 are adapted to engage each other when they come in alignment with the slots 28 provided in the opposite sides of the said roll.

The conductor 29 leads from the magnetic mechanism 14 to one contact member 27, while a conductor 30 leads from the main line wire 23 to the contact members 26, 27 upon opposite sides of the machine, and a conductor 31 leads from the other contact member 27 back to the reversing mechanism 14.

When the machine is started, the roll moves in one direction until one of the proper contact members 26 is brought into engagement with its corresponding member 27 through one of the proper slots 28, which engagement allows a current to pass through the magnetic mechanism 14 which throws the shifting piece 13 into the opposite clutch face, thus causing the roll to reverse its direction when it reaches the ends of lines 6.

Any suitable mechanism may be employed, such as a telegraph sounder for imparting sound from the roll through its cooperation with the perforations in the lines 6. This sounder comprises an electrical sounding box 32 energized by any suitable means such as a battery, the terminals of which box are connected to opposite sides of the sheet 5. Beneath the sheet is a transverse conductor 33 connected to one terminal by a wire 34, and a wire 35 connects the other terminal to a movable member 36 adapted to contact with conductor 33 when not separated therefrom by the sheet. An insulated handle is associated with the movable contact 36 for moving the same transversely of the sheet from line to line. Obviously, the duration of disconnected sounds in the box 32 is proportional to the length of the dots and dashes formed through the sheet.

From the foregoing description taken in connection with the accompanying drawings, it will be understood in this connection that an apparatus of transmitting sounds in code form to the blind for imparting knowledge by means of literature is provided which will fulfil all of the necessary and desired requirements.

Having thus fully described the invention, what I claim as new and desire to protect by Letters Patent is:—

1. A device of the character described, comprising a pair of shafts, a sheet wound around said shafts and adapted to be wound from one to the other, an opening through said sheet, a pair of electrical contacts on opposite sides of the sheet in line with said opening and adapted to allow the passage of an electric current through them when registering with said opening, a two faced clutch mounted upon one of said shafts, a shifting piece between the faces of said clutch, and means electrically connected with said contacts for moving said shifting piece from one face to another when said contacts are in register with said opening.

2. A device of the character described, comprising a pair of shafts, a sheet wound around said shafts and adapted to be wound from one to the other, said sheet having pairs of lines of subject matter thereon reading in opposite directions, means for imparting rotation to one of said shafts, and means for reversing the rotation at the end of each line.

3. A device of the character described, comprising a pair of shafts, a sheet wound around said shafts and adapted to be wound from one to the other, said sheet having pairs of lines of subject matter thereon reading in opposite directions, means for imparting rotation to one of said shafts, means for reversing the rotation at the end of each line, said means comprising a two faced clutch mounted upon one of said shafts, a shifting piece between said faces, a perforation in said sheet near the end of each line, a pair of electrical contacts on opposite sides of the sheet in line with said opening and adapted to allow an electrical current to pass through them when in register with said opening, and electrical means actuated by the current passing through the contacts for moving said shifting piece from one face to the other.

4. A device of the character described, comprising a pair of shafts, a sheet wound around said shafts and adapted to be wound from one shaft to the other, said sheet having pairs of lines thereon, the lines reading successively in opposite directions, means for rotating said shafts, means for reversing said rotation at the end of each line, and means associated with said lines for producing sound corresponding to the subject matter of the lines.

5. A sound transmission device comprising a pair of shafts, a sheet wound around said shafts and adapted to be wound from one to the other, said sheet having pairs of lines of perforations formed therein, electrical contacts on opposite sides of the sheet and adapted to engage one another when in registration with a perforation, means for supplying current to said contacts, a sounding box connected to said contacts, a reverse slot formed in the sheet at the end of each line, a second pair of electrical contacts on opposite sides of the sheet in line with said slots and adapted to allow an electrical current to pass through them when in registration with said slots, and electrical means actuated by the current passing through the contacts for reversing the movement of said sheet.

In witness whereof I have hereunto set my hand.

MAURICE BRODEUR.